May 31, 1927. 1,630,907
G. G. ROYER
AUTOMATIC MEANS FOR RUNNING-OFF LIQUID FROM CONTAINERS AT
PREDETERMINED CONDITIONS OF TEMPERATURE
Filed May 8, 1925

INVENTOR
Georges Gaston Royer
BY Townsend & Decker
ATTORNEYS.

Patented May 31, 1927.                                      1,630,907

UNITED STATES PATENT OFFICE.

GEORGES GASTON ROYER, OF PARIS, FRANCE.

AUTOMATIC MEANS FOR RUNNING OFF LIQUID FROM CONTAINERS AT PREDETERMINED CONDITIONS OF TEMPERATURE.

Application filed May 8, 1925, Serial No. 28,871, and in France June 4, 1924.

This invention relates to automatic means for running off liquids from a container at predetermined conditions of temperature.

It has already been proposed, especially to prevent bursting of reservoirs such for example as radiators for automobiles and other engines at freezing temperatures, to provide a thermostat for controlling an emptying member such as a tap, valve or the like; certain known arrangements of this nature have however the defect of not providing for a free outlet from the emptying member but only a progressive opening as the temperature becomes lower than a minimum predetermined temperature.

To obviate these defects I, according to this invention, provide a suitable thermostat, a releasing means retaining a valve or similar member which blocks the emptying orifice of a container in its closed position whereby when the temperature attains a predetermined limit the valve or the like is fully opened.

The invention is illustrated in the accompanying drawings as applied to the radiator of an automobile engine but the invention is applicable to other containers which can be emptied into the atmosphere.

Figure 1:
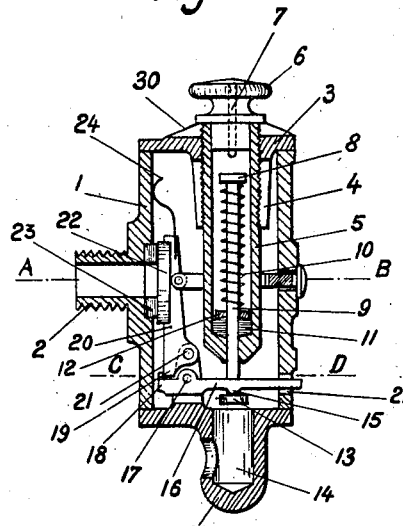
Figure 1 is an axial vertical section with the parts in their closed position.
Figure 2:
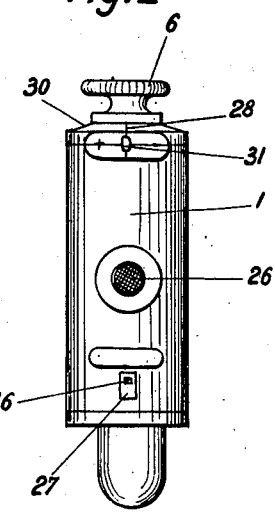
Figure 2 is a front elevation.
Figure 3:
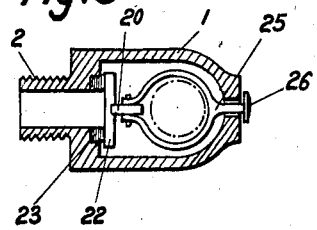
Figure 3 is a section on the line A—B of Figure 1.
Figure 4:
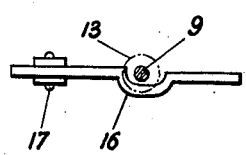
Figure 4 is a partial section on the line C—D of Figure 1.
Figure 5:
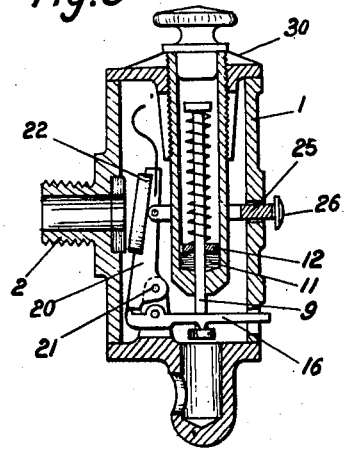
Figure 5 is a view similar to Figure 1 showing the valve in its open position.

Referring to Figures 1 to 5, 1 is a casing and 2 a tube adapted to be screwed into the lower portion of a radiator or container, not illustrated. Casing 1 is provided with a cover 3 into which and a depending sleeve 4 is screwed a thermostat formed of a tube or casing 5; sleeve 4 is provided with a number of slots to give it the required elasticity. Tube 5 is closed at its upper end by a stopper 6 provided with a milled head and maintained fluid tight therein by soldering or other suitable means. Stopper 6 is provided with a vent 7 obturated by a peg forced in after filling the tube 5 with an inert fluid (not shown) such as glycerine or material having a suitable coefficient of expansion. A plunger 9 provided with a head 8 is movably mounted within the casing 5. A spring 10, utilized for maintaining the packing material (referred to below) in fluid-tight relation to the plunger body 9 and also to assist in moving the plunger inwardly, is preferably coiled about the plunger and engages at one end against the head 8 which moves freely within the thermostatic chamber preferably out of contact with the walls of the casing 5. The plunger 9 passes out of tube 5 through a plastic packing 11 maintained against the bottom of tube 5 by a cap or washer 12 of metal for example against which the lower end of spring 10 abuts.

As illustrated tube 5 is adapted to be filled with glycerine for which reason the packing 11 consists of a moulded biconical washer formed of antacid india rubber. To prevent leakage of glycerine through the joint a little solid grease may be applied below the joint to obstruct all outlet.

At its lower end the plunger 9 is provided with another head 13 which can move in a recess 14 formed in an end 29 fast with casing 1; 16 is a lever pivoted on a fixed point 17 and provided with a boss 15 in the path of head 13; lever 16 is provided with a fang 18 for retaining the tail 19 of an arm 20 pivoted at 21 upon an extension of the end piece 29. The arm 20 carries a valve 22 for closing access to the tube 2, the numeral 23 indicating a packing or facing element which as illustrated is of moulded extra supple india rubber. 24 is a spring constantly tending to thrust valve 22 into its open position and 25 is a rod provided with a button 26 which abuts against casing 1. The lever 16 also projects beyond casing 1 through an opening 27.

The position of the thermostatic tube 5 inside casing 1 is determined by screwing the thermostat more or less into cover 3 so that at a predetermined temperature release is effected; a marking 28 upon an elastic washer 30 carried by the tube 5 and stopper 6 is then brought opposite a marking 31 on the cover 3.

The operation of the device is as follows:

Since the thermostatic fluid fills the entire space within the thermostatic tube 5 and completely surrounds the plunger 9 and head 8, an increase in the temperature of the thermostatic fluid causes the fluid to dilate and exert a pressure in all directions. The pressure acting upon the head of the plunger is more effective than that operating beneath the shoulder of the head, due to the larger area of the upper surface of the head 8, the result being that the plunger is forced outwardly to provide increased space for the dilating fluid. Stated differently, an increase in the volume of the fluid in the thermostatic chamber, due to an increase in the temperature thereof, creates a pressure within the chamber and since the only displaceable element in the thermostatic chamber is the plunger 9, this element is forced outwardly, the lower end of the plunger passing into the recess 14 in the casing. The spring 10 at all times exerts a pressure on the packing material 11, this pressure increasing as the plunger moves outwardly. Upon a decrease in the temperature of the thermostatic fluid a reverse action takes place, the plunger being drawn upwardly into the casing 5 due to the decrease in the volume of the thermostatic fluid. During this action the spring continues to maintain a pressure on the packing and assists in drawing the plunger into the casing 5 thus preventing the entrance of air into the thermostatic chamber during the contraction of the fluid and maintaining an air-tight seal for the plunger at all times. An inward movement of the plunger 9 to a predetermined extent, the position reached for example when the temperature is substantially 0° C, causes the latch 16 to become disconnected from the arm 20 of the valve closure 22 permitting the spring 24 and the force of the contained liquid to open the valve to permit the rapid escape of the liquid from the container. When the temperature of the mechanism has advanced above the predetermined temperature the valve and release mechanism may be re-set through the rod 25 and the lever 16 and the container may then be refilled.

When it is desired to empty the reservoir to which the apparatus is applied it is only necessary for opening valve 22 to raise the projecting end of lever 16 to free tail 19 of arm 20.

It may however be considered inadvisable to allow lever 16 to project; in this case it can be manipulated by the insertion of the blade of a penknife or a spanner in any suitable manner. A spring may also be arranged which constantly tends to maintain or bring lever 16 into the closed position shown in Figure 1 or the weight of the extended end of this lever may serve, as in the construction disclosed, to assist in maintaining the fang 18 in raised position.

The shape of the casing 1 and the arrangement of the parts therein may vary according to the particular use for which the apparatus is intended. The thermostat 5 may be arranged vertically, horizontally or in any other position. The end 29 may be provided with a union of any suitable nature for connection with an emptying pipe.

The invention is applicable to effecting the automatic emptying of containers or reservoirs when near to freezing or to move a valve or other member when the surrounding temperature or that of the liquid attains a predetermined value.

Figure 6:
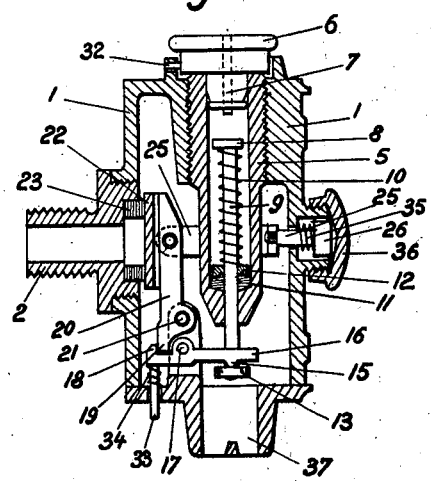
Figure 6 is an axial vertical section of a modification.

In a modification shown in Figure 6 the same elements have been given the same figures of reference. In this modification however the cover is cast with the casing 1 which thereby becomes stronger. The thermostat 5 may after adjustment by means of the button 6 be rendered a fixture by a pin 32 so avoiding all possibility of opening the valve 22 owing to defective adjustment.

Lever 16 is wholly within the casing and is provided with an outwardly projecting release pin 33 maintained normally in correct position by a spring 34.

The blade spring 24 is replaced by a spiral spring 35 which abuts against the button 26 and directly and forcibly actuates rod 25. 36 is a cap which may be screwed over the housing for button 26 whereby there is no liability of this being inadvertently pushed inwards; this arrangement also allows a radiator for example to be filled after having been automatically emptied without it being necessary to wait until the apparatus becomes heated to allow levers 16 and 20 to be set. Since the cap 36 may be screwed up tightly against the button 26 thereby holding the valve 22 closed until the fluid in the tube 5 becomes sufficiently warm to release the lever 16 and admit the fang 18 to lock the arm 20 in the normal way after which the cap 36 may be unscrewed sufficiently to permit the valve 22 to be opened as above described.

Outlet orifice 37 is situated axially with the thermostat which increases the rate of emptying by eliminating the changes of direction of the flow as in Figure 1.

The screw threaded connection 2 for screwing into the radiator for example is preferably of bronze.

It is obvious that the thermostat disclosed has numerous uses other than those disclosed and that applicant is entitled to protection thereon for any uses to which it may be put.

I claim—

1. In automatic means for running off liquid from a container at predetermined conditions of temperature, a hermetically closed tube filled with a material having a suitable coefficient of expansion, a plunger within the tube and projecting therefrom, a packing surrounding the plunger, a spring pressing against the plunger and the packing, a member adapted to close an outlet from said container, means for normally retaining said member in its closed position, and release means for said retaining means operated by the movement of the plunger at said predetermined temperature conditions.

2. In automatic means for running off liquid from a container at predetermined conditions of temperature, a thermostat, a pivoted lever adapted to be actuated by the thermostat at said predetermined temperature conditions, a pivoted arm, means on the lever for normally locking said pivoted arm in one position, a member carried by the arm and adapted to close an outlet from said container when said arm and lever are interlocked and a spring tending to remove said member away from said outlet, said lever being adapted to release said arm when actuated by the thermostat.

3. In automatic means for running off liquid from a container at predetermined conditions of temperature, a casing adapted to be connected to an outlet from the container, a thermostat within the casing, a pivoted lever adapted to be actuated by the thermostat at said predetermined temperature conditions, a pivoted arm, a member adapted to close an outlet from said container and carried by the arm, means tending to move said member to open position, means controlled by said lever for normally retaining said member in its closed position, said lever adapted to release said means from said member when actuated by the thermostat, and a rod connected to said arm and passing through the casing.

4. In automatic means for running off liquid from a container at predetermined conditions of temperature, a casing adapted to be connected to an outlet from the container, a thermostat, a pivoted lever adapted to be actuated by the thermostat, a pivoted arm, means on the lever for normally locking said pivoted arm in one position and adapted to be released from said arm by the action of the thermostat on the lever at said predetermined temperature, a member carried by the arm and adapted to normally close the outlet from said container, a spring tending to remove said member away from said outlet, and a rod connected to said arm and passing through the casing.

5. In automatic means for running off liquid from a container at predetermined conditions of temperature, a casing adapted to be connected to an outlet from the container, a thermostat within the casing, a pivoted lever adapted to be actuated by the thermostat at said predetermined temperature conditions, and projecting through the casing, a member adapted to close an outlet from said container, means tending to move said member to open position and means on said lever for normally retaining said member in its closed position.

6. In automatic means for running off liquid from a container at predetermined conditions of temperature, a casing adapted to be connected to an outlet from the container, a thermostat within the casing, a pivoted lever adapted to be actuated by the thermostat and projecting through the casing, a pivoted arm, means on the lever for normally locking said pivoted arm in one position and adapted to be released from said arm by the action of the thermostat on the lever at said predetermined temperature, a member carried by the arm and adapted to normally close an outlet from said container and a spring tending to remove said member away from said outlet.

7. In automatic means for running off liquid from a container at predetermined conditions of temperature, a casing adapted to be connected to one outlet from the container, a thermostat constructed to be secured to said casing, a marking on a portion of the thermostat projecting from the casing and markings on the casing whereby the thermostat may be set into one of a plurality of definite positions, a member adapted to close an outlet from said container, means for normally retaining said member in its closed position and release means for said retaining means operated by the thermostat at said predetermined temperature conditions.

8. In automatic means for running off liquid from a container at predetermined conditions of temperature, a casing provided with markings, and adapted to be connected to an outlet from the container, a hermetically closed tube filled with a material having a suitable coefficient of expansion constructed to be screwed into said casing and provided with a marking on a portion projecting from the casing whereby the tube may be set into one of a plurality of definite positions, a plunger within the tube and projecting therefrom, a packing surrounding the plunger, a spring pressing against the plungers and the packing, a member adapted to close an outlet from said container, means for normally retaining said member in its closed position, and release means for said retaining means operated by the movement of the plunger at said predetermined temperature conditions.

9. In automatic means for running off liquid from a container at predetermined conditions of temperature, a casing adapted to be connected to an outlet from the container, a thermostat constructed to be adjustably secured to said casing, means for locking the thermostat when adjusted in position, a member adapted to normally close an outlet from said container, means for normally retaining said member in its closed position and release means for said retaining means operated by the thermostat at said predetermined temperature conditions.

10. In automatic means for running off liquid from a container at predetermined conditions of temperature, a casing adapted to be connected to an outlet from the container, a thermostat supported by said casing, a pivoted lever adapted to be actuated by the thermostat at said predetermined temperature, a pivoted arm, a closure member adapted to close an outlet from said container and operatively associated with said arm, means associated with said pivoted lever for normally retaining said valve in its closed position, means tending to move the closure member to open position, means connected to said arm and accessible from without said casing for moving said closure member to closed position and a cap normally preventing access to said last-named means.

In testimony whereof I have affixed my signature.

GEORGES GASTON ROYER.